United States Patent Office 3,346,296
Patented Oct. 10, 1967

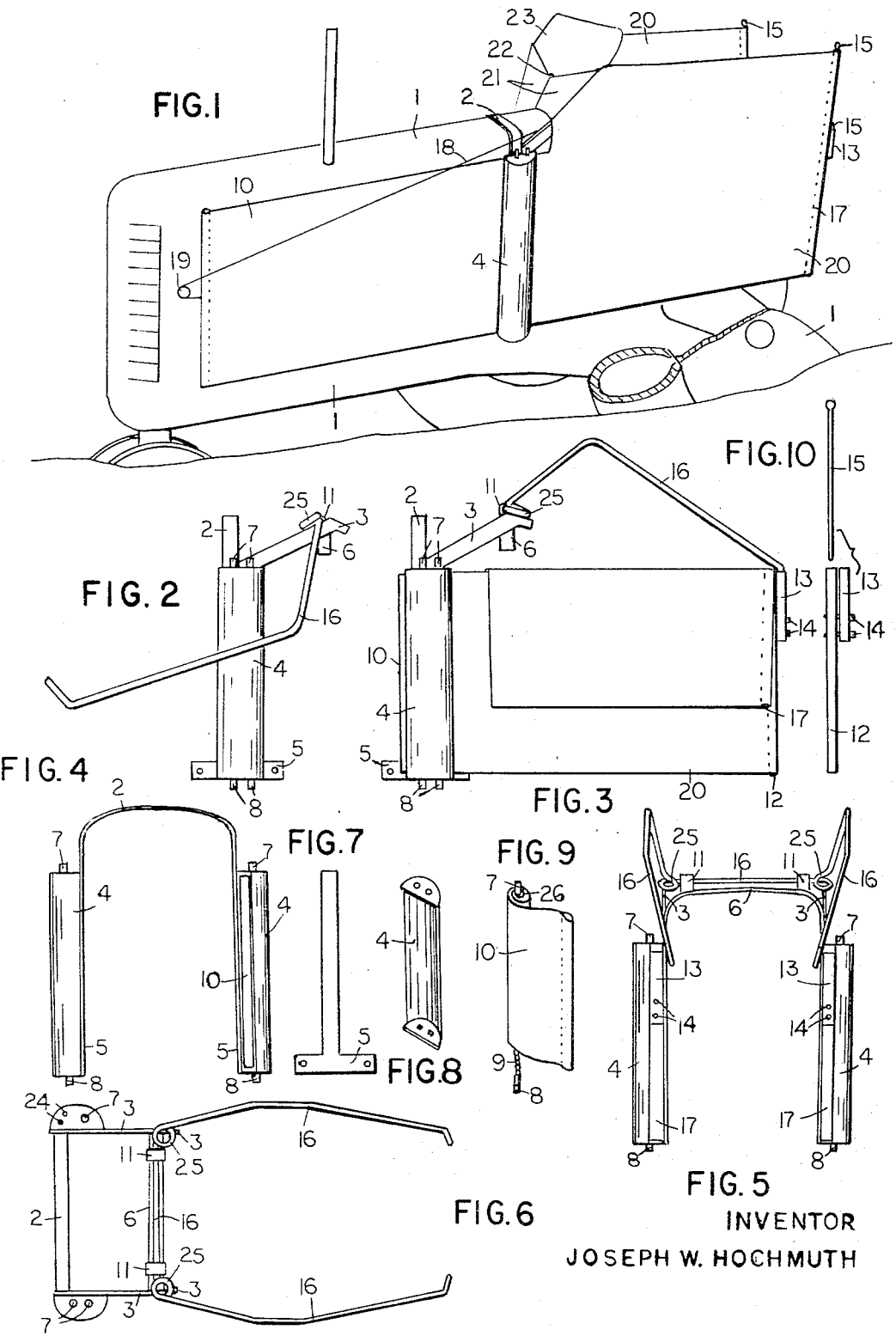

3,346,296
FOLD-UP ROLL-UP TRACTOR WINDBREAKER WARMER
Joseph W. Hochmuth, Roundup, Musselshell County, Mont. 59072
Filed Jan. 8, 1965, Ser. No. 424,236
1 Claim. (Cl. 296—78)

The specification, which includes the description of the invention and the claim, is written here.

This invention relates to shield or windbreak that protect the tractor operator from the cold.

The object of the invention is to provide a windbreaker warmer that will fold up, roll up out of the way, when the weather is good and when it gets cold or windy, it can be unrolled and unfolded to protect the operator from the wind and to funnel warm air from the manifold side of the motor back around the operator.

One advantage is that it is light weight and does not take up much space and is not out in the way for operating the tractor.

Another advantage is that it does not require much time to assemble or disassemble and it is easily done.

Another advantage is that its back curtains are held in place or closed by an arm which has spring tension on it and to enter either side it is just pulled open and it automatically closes.

Another advantage is that the curtains have spring loaded rollers for rolling up.

Another advantage is that the front curtain can be adjusted so as to direct the right amount of heat back, by a cord that extends up to the operator.

Another advantage is that it can be made to fit many different makes of tractors.

FIGURE 1 is a perspective view of the fold-up, roll-up tractor windbreaker warmer, with the curtains unrolled and in position to break the wind and direct the heat back around the tractor operator.

FIGURE 2 is the side view of the warmer when it is all folded and rolled up out of the way.

FIGURE 3 is the side view of the warmer with the curtain support arm extending back and the curtain pulled out with the top folded down.

FIGURE 4 is the front view of the warmer, just showing the very front.

FIGURE 5 is the back view with the curtain support arm extending back.

FIGURE 6 is the top view with the curtain support arm extending back.

FIGURE 7 is the lower part of the frame with mounting holes.

FIGURE 8 is the perspective view of the inside of the curtain holder.

FIGURE 9 is a spring loaded roller curtain.

FIGURE 10 is the back curtain staff and staff extension.

Now a detailed description referring to the drawing, fold-up, roll-up tractor windbreaker warmer made in accordance with the present invention is shown to include a saddle type frame which mounts over top of tractor 1, just in front of the steering wheel, said frame consists of two strips of metal 6 and 2, which are curved to fit the top of the tractor and are spaced and held rigidly by two strips of metal 3, one on each side. Curtain holders 4 are secured to a T-shaped lower frame member 5 which are welded on and extend downwardly from the frame strip 2, on each side of tractor 1, with holes in the frame 5 to bolt the frame 5 to tractor 1. Mounted on the upper part of frame 6 are two hinge brackets 11 which hold the curtain support arm 16. These arms are made of a steel rod that is generally U-shaped and comprises a bight portion which extends through the hinge brackets 11, which permits it to hinge vertically, with a spiral coil 25 of one and one-quarter turns on the outer side of the brackets 11. The spiral coil 25 permits the support arms 16 to be horizontally flexible and also provides a stop means which abuts the frame strip spacers 3, in either an operative position wherein the curtain support arms extend upward and rearwardly to each side of the steering wheel or in an inoperative position wherein the curtain support arms extend downwardly on each side of the engine. Number 7 is the upper stub shaft of the curtain roller, with the one end extending out about an inch and the other end extending into the roller tubing 26 about an inch with a pin through both, the inner end of the shaft is turned down so that a couple spirals of the coil spring 9 will fit over it and with a hole in the shaft so that the end of the spring 9 can be bent to fit into the hole. Number 8 is the lower stub shaft with the upper end fixed to anchor the coil spring 9 to it, the same as the upper shaft 7 and the other end is squared so that it can be anchored in a square hole in the curtain holder 4 against rotation, and also has a slot across the end for a screw driver. There are two small holes in the shaft 8, one is for a pin to keep the shaft from slipping up out of the square anchor and the other is a lower hole for a pin to keep the shaft from raising up too high when tightening up the spring 9 that works inside tubing 26 which is the body of the roller to which front curtain 10 or rear curtains 20 are cemented and the curtains 20 have a loop 17 in the free end thereof receiving staff 12. The curtains 20 are provided with flap portions which receive staff extensions 15 when in the operative position. Staff 12 is made of pipe which fits inside the loop on the end of the curtain, it has two holes about four and five and a half inches down from the top which are threaded for one-fourth inch bolts 14 which hold the socket 13 which is made of pipe for the ends of curtain support arms to extend into. Number 15 is the staff extension which has a knob on the end, and which holds the upper flaps of the rear curtains in place by extending through the upper end of the loop down through and into the staff 12. Cord 18 is connected to the front curtain 10 to operate said front curtain and extends over pulley 19 which is hooked to tractor 1. A windshield 23 fits between the curtains 20 and the curtain support arms. It may or may not be transparent but must be flexible so it can be rolled up with one of the back curtains. Number 21 is the upper front corners of curtains 20 that are drawn over curtain support arms 16 and held together by a fastener 22. Holes 24 in curtain holder 4 are for the storage of the staff extensions.

Now to explain the operation of this invention, the saddle frame with the curtains is placed on and astraddle of the tractor's engine hood just ahead of the steering wheel and bolted down with one or more bolts through bracket 5 on each side. The curtain adjusting cord 18 extends from the free end of curtain 10 to and around pulley 19 hooked to the front side of the tractor 1 and back to the tractor operator. Now the device is in place and ready for use at any time. To put it to use, the curtain support arms 16 are pivoted to the operative position, the curtains 20 are pulled out and the ends of the curtain support arms 16 are inserted into sockets 13 which are on the ends of the curtains, this holds the curtains 20 back and in place and the spring 9 in the rollers keep them tight, the staff extensions 15 are taken out of their storage 24 and inserted into the upper ends of the back curtain loops 17 to extend down through into the staff 12, this holds the upper back ends of the curtains 20 in place and the front upper ends 21 are drawn over curtain support arms 16 and pulled up tight and held together by fastening means 22 and if desired the windshield 23 is slipped in place between the curtains 20 and curtain support arms 16, the front curtain 10 is pulled into place by the cord 18, with knots in the cord at different intervals to hook in a V part of the frame so the curtain 10 can be adjusted to regulate the amount of heat desired to be directed back to the operator.

To enter or leave, a person just swings the curtain panel out away from the side of the tractor seat and upon release it automatically closes again due to the coil spring 25 and resiliency in the curtain support arms 16. When it is quite cold there is a curtain to hook on the back and one under the seat.

To disassemble the windbreaker warmer, a person just reverses the procedure.

Now to present my claim of what is now claimed as new and my own invention, to be protected by Letters Patent of the United States is:

In combination, a tractor and an extendable, assembleable windbreaker warmer comprising, a saddle type frame securely mounted to a tractor, vertically mounted curtain holders secured to said frame and extending down on each side of said tractor, forwardly and rearwardly extendable curtains mounted in said holders, flexible curtain support arms with a spiral coil to provide spring tension thereto are hingedly attached to the upper part of said frame and have downwardly turned ends in the operative position receivable into sockets which are fixedly attached to staffs which are encircled by loops on the free ends of said rearwardly extending curtains in the extended position, staff extensions receivable into the loops of the upper portion of said rearwardly extendable curtains and into said staffs to hold the curtains extended and erect, the upper front ends of said rearwardly extendable curtains are drawn tightly together over the curtain support arms and held with a fastening means, said forwardly extendable curtain having operating means secured to the free end thereof whereby said forwardly extendable curtain may be adjusted to various positions to control the amount of heat directed rearwardly from the tractor to an operator.

References Cited

UNITED STATES PATENTS

| | | | |
|---|---|---|---|
| 1,304,089 | 5/1919 | Payne | 160—23 |
| 1,403,299 | 1/1922 | Dewstow | 160—122 X |
| 1,427,038 | 8/1922 | Toadvine | 160—23 |
| 1,486,424 | 3/1924 | Ferno | 160—121 X |
| 2,546,843 | 3/1951 | Zigterman | 160—290 X |
| 2,707,031 | 4/1955 | Williams | 296—78 X |
| 2,842,868 | 7/1958 | Belter | 296—78 X |
| 3,050,075 | 8/1962 | Kaplan et al. | 160—122 X |

FOREIGN PATENTS

| | | |
|---|---|---|
| 646,718 | 7/1928 | France. |

DAVID J. WILLIAMOWSKY, *Primary Examiner.*

HARRISON R. MOSELEY, PETER M. CAUN,
*Examiners.*